United States Patent [19]
Gessner

[11] 3,930,813
[45] Jan. 6, 1976

[54] PROCESS FOR PRODUCING NITROGEN DIOXIDE-FREE OXYGEN-ENRICHED GAS

[75] Inventor: David M. Gessner, Worcester, Mass.

[73] Assignee: General Electric Company, Milwaukee, Wis.

[22] Filed: Nov. 27, 1974

[21] Appl. No.: 527,699

[52] U.S. Cl. .............................. 55/16; 55/68; 55/90
[51] Int. Cl.² .................. B01D 53/22; B01D 53/16
[58] Field of Search ...................... 55/16, 68, 90, 158

[56] References Cited
UNITED STATES PATENTS

| | | |
|---|---|---|
| 2,966,235 | 12/1960 | Kammermeyer ........................ 55/16 |
| 3,121,624 | 2/1964 | Matsch et al. ...................... 55/68 X |
| 3,280,536 | 10/1966 | Berlin ................................ 55/68 X |
| 3,369,343 | 2/1968 | Robb ..................................... 55/16 |
| 3,463,603 | 8/1969 | Freitas et al. ....................... 55/68 X |
| 3,784,478 | 1/1974 | Altwicker et al. ................... 55/68 X |

*Primary Examiner*—John Adee
*Attorney, Agent, or Firm*—Thomas J. Bird, Jr.; Granville M. Pine; Edward A. Hedman

[57] ABSTRACT

Membrane permeation processes to produce oxygen-enriched gas from atmospheric air are improved by initially contacting an ambient air feed with triethanolamine to substantially reduce the nitrogen dioxide content in the air and thereafter feeding the nitrogen dioxide depleted air to an array of membrane cells and finally withdrawing the oxygen-enriched permeate output therefrom, substantially free of nitrogen dioxide, for further use.

8 Claims, 2 Drawing Figures

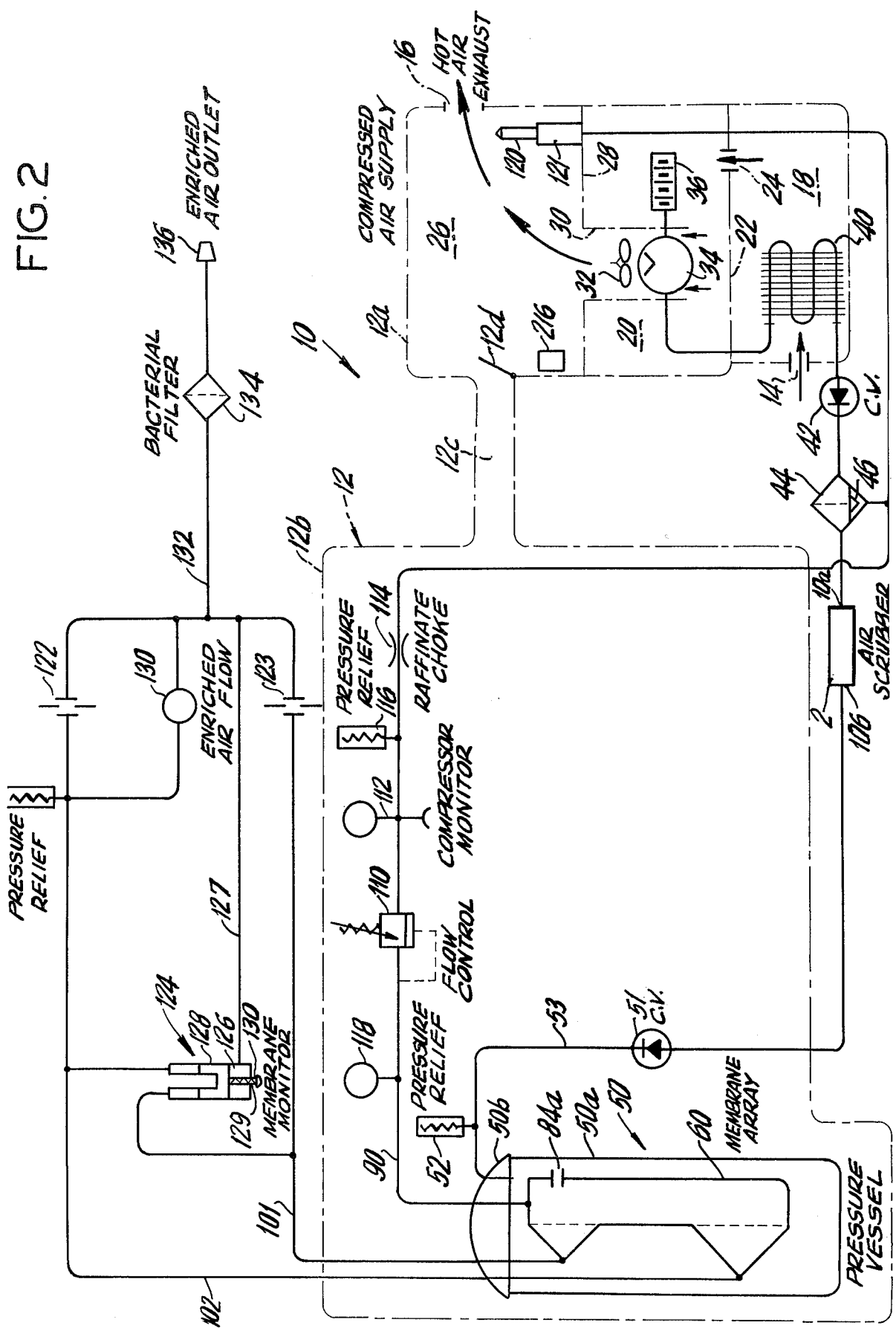

PROCESS FOR PRODUCING NITROGEN DIOXIDE-FREE OXYGEN-ENRICHED GAS

The present invention relates to a process for gas separation by means of permeable membranes, and more specifically to an improved process for enriching atmospheric air with oxygen, while decreasing the content of nitrogen dioxide pollutants to essentially nil.

BACKGROUND OF THE INVENTION

In the treatment of patients suffering from respiratory ailments, such as emphysema where the patient's lung capacity is severely restricted, it is common practice to provide the patient with a source of oxygen-enriched gas. Typically, this source of oxygen-enriched gas is provided from a pressurized oxygen cylinder which may be located remotely from the patient in a hospital and supplied through suitable tubing (central storage type) or may be an individual cylinder located at the patient's bedside. Since many of these ailments are chronic and require extended therapy, portable oxygen cylinders which the patient may use at home have been developed.

While the use of individual cylinders provides the necessary life-sustaining therapy for these patients, the cylinders themselves present several problems when used in the home. Specifically, since these cylinders contain enriched-oxygen gas, they present a constant danger of fire and explosion during use. The individual cylinders have limited capacity, and therefore must be serviced and replaced routinely, thereby increasing the cost of therapy. In addition, there may also be leakage problems which may unexpectedly diminish the capacity of a cylinder so that the patient is left with inadequate therapy gas.

Atmospheric air, which contains about 20% oxygen and 78% nitrogen, provides a vast and abundant source of oxygen. However, until recently, technology for extracting oxygen economically for individual use has been lacking. With the development of thin permselective membranes, such as those of plastics, such as silicone rubber, polyphenylene ethers, and the like, and associated systems technology, feasible separation of gases has been achieved.

The separation of gases in such membrane systems technology is based on the selective permeability of certain materials. The term "selective permeability" means that one gas in a mixture will permeate through a membrane faster than a second gas, but this is not to suggest that one gas passes through the membrane to the complete exclusion of all others. Rather, a difference in the flow rate of two molecular species through a permeable membrane results so that the gas mixture on one side of the membrane is depleted in concentration of the more permeable component and the gas on the opposite side of the membrane is enriched with the more permeable component.

In either case, because of the nature of the system, nitrogen dioxide ($NO_2$), which is in equilibrium with dinitrogen tetroxide ($N_2O_4$), has a two-fold detrimental effect on membrane oxygen enrichers: (i) the membrane array enriches the $NO_2$ in permeate output because $NO_2$ has a very high rate of permeation through membranes, as compared to oxygen and nitrogen (more than 12× higher with a dimethyl silicone membrane, for example); and (ii) most membrane materials are chemically attacked and ultimately destroyed by $NO_2$. Nitrogen dioxide is contraindicated in therapeutic gas streams because it is poisonous, and it reacts with body fluids to form acids. For these reasons, it is important to remove $NO_2$ from such membrane enrichment processes and techniques for this are known, but are not entirely satisfactory. For example, the ambient air feed can be wet-scrubbed with caustic, but this unduly entrains moisture. The ambient air can be passed over a molecular sieve, but this is not rapid and efficient. Finally, the air can be passed over soda lime, but this is rapidly exhausted, generates heat and is generally inefficient.

It has now been discovered that feeding the ambient air into contact with triethanolamine efficiently and rapidly removes nitrogen dioxide to only a small fraction of that which is originally present. Then the so-treated air, depleted in nitrogen dioxide, can be delivered to the membrane cell array without fear of having this pollutant increased to therapeutically dangerous levels, and with minimization of membrane deterioration due to adverse chemical reactions.

SUMMARY OF THE INVENTION

According to the present invention, in a membrane permeation process to produce oxygen-enriched gas from atmospheric air comprising delivering a flow of atmospheric air feed to an array of selectively permeable membrane cells having a greater permeability of oxygen and nitrogen dioxide relative to nitrogen and maintaining a pressure differential across the array to produce an oxygen-enriched permeate therethrough, there is provided an improvement for reducing the nitrogen dioxide content in the permeate to substantially nil comprising:
  i. initially passing the atmospheric air feed containing at least an ambient content of nitrogen dioxide into contact with triethanolamine until removal of the nitrogen dioxide from the air feed is substantially complete; and
  ii. thereafter delivering the air depleted in nitrogen dioxide to the membrane cell array.

The triethanolamine can be in liquid or vapor or fog form for contact, e.g., by bubbling, or in a spray mist chamber, or the like. However, in preferred features of the invention, the triethanolamine will be supported, e.g., spread on the surface, or impregnated in, a particulate substance, e.g., crushed firebrick, molecular sieve rods, porcelain shapes, glass beads, and the like. In other preferred features, the triethanolamine loading will comprise from 10 to 35% by weight; and the atmospheric air will be compressed before being fed to the supported triethanolamine; and the supported triethanolamine will be in a pressure tight vessel acting as a scrubber in the high pressure conduit feeding the membrane cell array or stack.

In further preferred features, the ambient oxygen feed will contain about 0.1 parts per million of nitrogen dioxide and the membrane cell array is adapted to deliver oxygen-enriched gas having about 40% oxygen content and less than 0.0075 parts per million of nitrogen dioxide. A preferred cell membrane material is polyphenylene ether, e.g., poly(2,6-dimethyl-1,4-phenylene)ether.

BRIEF DESCRIPTION OF THE DRAWINGS

Understanding of the invention is facilitated by reference to the drawings in which:

FIG. 2 illustrates in flow diagram form a preferred apparatus for carrying out the process of the present invention, the flow diagram comprising an oxygen enricher incorporating an air scrubber, as shown in FIG. 1, in the line for feeding compressed air to the membrane array.

DETAILED DESCRIPTION OF THE INVENTION

Figure 1:
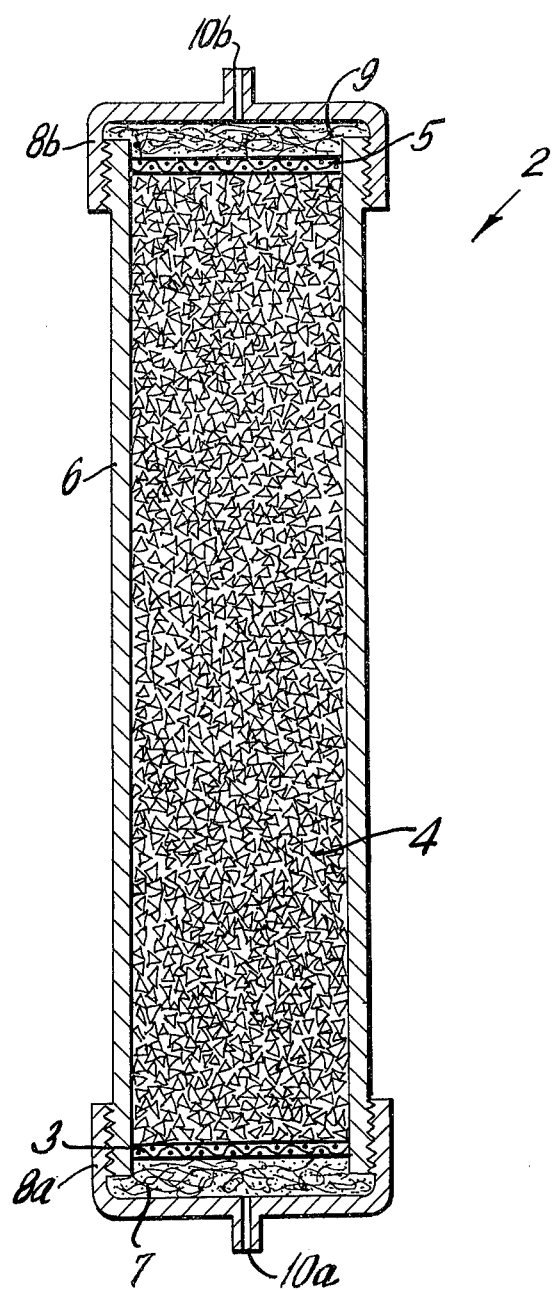
FIG. 1 illustrates, in vertical section, a cannister-type scrubber containing triethanolamine on a particulate support adapted for use as an element in the process of this invention.

While this invention is susceptible of embodiment in many different forms, there is shown in the drawings and will hereinafter be described in detail a system in which a preferred embodiment may be carried out, with the understanding that the present disclosure is to be considered as an exemplification of the principles of the invention and is not intended to limit the invention to the embodiments illustrated.

Referring to FIG. 1, scrubber 2 comprises a pressure vessel containing the active pollutant remover particles 4 comprising triethanolamine, impregnated on a crushed support, e.g., firebrick (Chromosorb A) or molecular sieve rods or spread on glass beads, and the like. The construction of the outer walls can be designed to fit the application, but for pressure use, the scrubber 2 comprises a pipe 6, of metal or the like, e.g., galvanized steel, having end caps 8$a$ and 8$b$ and nipples 10$a$ and 10$b$ for air entrance and exit ports, respectively. In accordance with conventional practice, the active pollutant removal particles 4 are supported on screen 3 and a top screen 5 can be included. Glass wool, or similar plugs, 7 and 9 can be included to filter out suspended fine solid particles. Scrubber 2 can be used in the embodiment illustrated in FIG. 2 or in any system in which it is desirable to remove nitrogen dioxide from the ambient air fed to the membrane array.

In FIG. 2 is shown a total oxygen enricher system which will be described to disclose a preferred embodiment.

In FIG. 2 is shown an oxygen enricher 10 in which atmospheric air is compressed and passed over an array of selectively permeable membranes which permit oxygen to permeate therethrough at a greater rate than nitrogen to provide a flow of oxygen-enriched gas for inhalation by a patient. Enricher 10 includes a housing 12 which is formed by two box-like structures to form a compressed air supply structure 12$a$ and a pressure vessel structure 12$b$, which are in fluid communication with each other by means of a flow channel 12$c$. A one way flapper valve 12$d$ is positioned in channel 12$c$ to permit air to flow from structure 12$b$ to 12$a$ to cool the pressure vessel, described below.

Air supply structure 12$a$ defines an atmospheric air intake port 14 and a hot exhaust port 16. The interior of structure 12$a$ is subdivided into three chambers or regions including a cool air region 18, an intake region 20 separated from region 18 by a divider member 22, which is apertured at 24 to provide a flow path therebetween, and an exhaust chamber 26. Chamber 26 is separated from chamber 20 by means of a dividing wall 28 which forms an air passage 30 between the chambers. Atmospheric air is drawn through the air supply structure 12$a$ by means of a fan 32 positioned within the structure, preferably within chamber 30.

A compressor 34 for producing the flow of compressed air for the enricher is positioned within chamber 20 and draws a supply of air through intake muffler 36 from the atmospheric air circulating through the air supply structure. Muffler 36 is designed to attenuate the noise level created by the compressor intake, preferably to less than 20 decibels, since the enricher is designed for use in the home and in close proximity to the patient. In addition to supplying the compressor with a source of air, it will be appreciated that the air circulating through the air supply structure provides a source of cooling air for the compressor. It will also be appreciated that a compressor having a fan mounted on its rotor may be used in place of separate fan 32 to circulate air through the structure.

Compressor 34 is designed to deliver a flow rate of from about 1.5 to about 1.7 cubic ft. per minute at 175 psi. The membrane cells in this embodiment are designed to deliver about 8 liters per minute of enriched gas containing about 40% oxygen when operating at 95°F. To remove the heat of compression from the compressed air, the compressed air is directed into an air fin heat exchanger 40 positioned in cool air chamber 18 so that the air entering through port 14 passes directly over the heat exchanger before entering the chamber 20. Heat exchanger 40 lowers the temperature of the compressed air to about 95°F. and also condenses water vapors which are present in the compressed air. After being cooled, the compressed air passes through a check valve 42 to a water vapor separator 44 in which the condensate is removed from the compressed air and held in the trap of the separator until a float 46 is raised and the condensate is delivered for vaporization, as described below.

After condensate has been separated from the compressed air, the air passes through scrubber 2 which contains triethanolamine to remove nitrogen dioxide according to the process of this invention to prevent this pollutant from becoming enriched beyond ambient conditions by the selectively permeable membrane cells. The compressed air, substantially depleted in nitrogen dioxide, is then directed to a pressure vessel 50 through a check valve 51 and pressure relief valve 52 in line 53. A membrane arrary 60 is positioned in pressure vessel 50. Vessel 50 includes a generally U-shaped chamber portion 50$a$ and a cover portion 50$b$ which is in sealing engagement with portion 50$a$ by means of a gasket and suitable clamping means (not shown) as is known in the art.

The system pressure is controlled by an adjustable relief valve 110 located in the raffinate line 90. Valve 110 may be a needle valve or any other type of valve with an adjustable orifice to control the flow rate by changing the pressure drop across the membrane stack. At a fixed temperature, the enriched air output from the membrane stack is directly proportional to the pressure differential across the membranes. Thus, raffinate flow measurement provides a means for accurately controlling oxygen enrichment without the need for a direct oxygen sensor. In this manner, by adjusting the flow rate at valve 110, the flow through the membrane stack and ultimately the oxygen enriched gas concentration may be controlled.

It has been found that when 25 liters per minute of compressed air at 95°F. and 175 psi. are delivered to the membrane array, the membranes comprising poly(2,6-dimethyl-1,4-phenylene)oxide, the stack will produce oxygen-enriched gas containing about 40% oxygen at the rate of 8 liters per minute. This enrichment results in the raffinate containing about 13% oxygen.

The raffinate flow is monitored by a combined pressure gauge and pneumatic switch 112 which are positioned upstream of a choke 114 in line 90. If the pressure in line 90 drops below the operating range of the array, an electro-pneumatic switch 112 actuates an alarm system. Should the pressure in raffinate line 90 experience an excursion, a pressure relief valve 116 is provided to relieve the line. The pressure in line 90 upstream of control 110 also may be monitored visually by gauge 118.

The raffinate is carried by conduit 90 to an exhaust muffler 120 positioned within exhaust chamber 26 so that the oxygen depleted air is mixed with atmospheric air and discharged into the atmosphere through port 16. Condensate from separator 44 is directed into the raffinate line and carried along with the raffinate flow to a water evaporator 121 positioned within exhaust chamber 26, so that the water is evaporated to the atmosphere as the raffinate is discharged through muffler 120.

With further reference to FIG. 2, the split output of oxygen enriched gas carried by conduits 101 and 102 serves as a membrane array leak detector by monitoring the flow ratio of the two groups of membrane cells. Leak detection is accomplished by comparing the pressure drops across orifices 122 and 123. Orifice 122 is a fixed cell group reference orifice and orifice 123 is an adjustable orifice which is initially matched to orifice 122 for given cell groups performance. In addition to monitoring the pressure drop ratio between orifices 122 and 123, the split cell group output is also utilized to measure the flow rate of the oxygen enriched gas, as explained above.

In FIG. 2, a preferred membrane cell group monitor can comprise a two-legged manometer 124 having a variable capacity reservoir 126 (e.g., bellows) so that the manometer may function as a combination differential and total pressure gauge. The variable capacity reservoir 126 contains a fluid 128 which is exposed to the pressure in the legs of the manometer and moves therein to provide a visual indication of the pressure and flow. The level of fluid 128 is set at a null point by means of a set screw 129. The bellows 126 is biased by a spring 130 to permit the reservoir to expand in volume in response to the total pressure in the manometer legs which are in fluid communication with conduits 122 and 123, respectively.

An imbalance in the pressures in conduits 101 and 102 will result in a difference in liquid level in the legs of the manometer, and the average depression is a measure of total pressure. Such a pressure differential indicates a leak in one of the two groups of cells of the membrane array, calling for correction.

In addition to the use of a manometer, a flow gauge 130 is also provided for determining the flow rate in one leg of the split stack which is proportional to the total output flow. Conduits 101 and 102 are joined to a single flow line 132 and passed through a bacteria filter 134 to a hose barb 136 on which a hose and associated inhalation mask may be secured. In this manner, oxygen-enriched gas is delivered to a patient. To accommodate back pressure introduced into the output line 132, such as might be caused by the patient coughing into the face mask, a relief line 127 provides communication between line 132 and the exterior expansible boundary of reservoir 126 to balance the manometer during such periods so that the average liquid height is unaffected.

In a first example, a 10% by weight solution of triethanolamine in water is prepared. Crushed firebrick (Chromosorb A, Johns-Manville Company) is soaked in the solution, removed therefrom after one hour and dried for 2 hours at 105°C. The loading of triethanolamine is 10–15% by weight. A galvanized 2 inch, 1.0 steel pipe with threaded end caps is filled with the active absorbant, being kept in place with screens and glass wool plugs. The filled scrubber is then installed in the high pressure feed line of an oxygen enricher of the general type described above. It is found that the scrubber removes greater than 90% of the $NO_2$ which enters it, resulting in a much decreased concentration of $NO_2$ which the membrane array is required to treat.

In a second example, a scrubber is fabricated as in the first and filled with 40 g. of absorbant having a 26.5% triethanolamine loading. The unit is placed in an oxygen enricher in the high pressure line and it is found that the initial $NO_2$ removal efficiency is 95% at 4 parts per million. After 240 hours of operation, the efficiency decreases only to 74%, a value which corresponds to 9600 running hours at 0.1 parts per million of nitrogen dioxide, which is a typical $NO_2$ ambient air concentration.

In a third example, an absorbant is prepared as in the first, but substituting molecular sieve rods (Union Carbide Company) for the crushed firebrick as a support. The absorbant is placed in a scrubber and tested. It is found to remove 90% of the nitrogen dioxide from the ambient air feed.

From the above description, it will be readily appreciated that a process is provided to produce oxygen-enriched gas from atmospheric air, with a low content of nitrogen dioxide. Modifications thereto in addition to those described may be made by those skilled in the art without departing from the spirit and scope of the invention as pointed out in the claims. A pressure oxygen enricher system such as that described above is disclosed in pending U.S. patent application Ser. No. 476,298 of Richard H. Blackmer and Jonathan W. Hedman, filed June 4, 1974, incorporated herein by reference.

I claim:
1. In a membrane permeation process to produce oxygen-enriched gas from atmospheric air comprising delivering a flow of atmospheric air feed to an array of selectively permeable membrane cells having a greater permeability of oxygen and nitrogen dioxide relative to nitrogen and maintaining a pressure differential across said array to produce an oxygen-enriched permeate therethrough, the improvement for reducing the nitrogen dioxide content in said permeate to substantially nil comprising:
   i. initially passing the atmospheric air feed containing at least an ambient content of nitrogen dioxide into contact with triethanolamine until removal of the nitrogen dioxide from the air feed is substantially complete; and
   ii. thereafter delivering the air depleted in nitrogen dioxide to the membrane cell array.
2. A process as defined in claim 1 wherein the triethanolamine is supported on a particulate substance.
3. A process as defined in claim 2 wherein said inert particulate substance is crushed firebrick.

4. A process as defined in claim 3 wherein the triethanolamine loading on the crushed firebrick comprises from about 10 to about 35% by weight.

5. A process as defined in claim 2 including the step of compressing the atmospheric air before feeding it into contact with the triethanolamine supported on said inert particulate substance.

6. A process as defined in claim 5 wherein the triethanolamine supported on said inert particulate substance is maintained in a pressure tight vessel in the high pressure conduit feeding the membrane cell array.

7. A process as defined in claim 1 wherein the ambient oxygen feed contains about 0.1 parts per million of nitrogen dioxide and said membrane cell array is adapted to deliver oxygen-enriched gas having about 40% oxygen and less than 0.0075 parts per million of nitrogen dioxide.

8. A process as defined in claim 1 wherein said cell membranes are formed of a polyphenylene ether.

* * * * *